US00RE48765E

(19) United States
(12) Reissued Patent
Memering et al.

(10) Patent Number: US RE48,765 E
(45) Date of Reissued Patent: Oct. 5, 2021

(54) LASER MARKING PROCESS

(71) Applicant: Apple Inc., Cupertino, CA (US)

(72) Inventors: Dale N. Memering, Langhorne, PA (US); Michael M. Li, San Jose, CA (US)

(73) Assignee: APPLE INC., Cupertino, CA (US)

(21) Appl. No.: 16/359,770

(22) Filed: Mar. 20, 2019

Related U.S. Patent Documents

Reissue of:
(64) Patent No.: 9,600,694
Issued: Mar. 21, 2017
Appl. No.: 14/705,955
Filed: May 6, 2015

U.S. Applications:
(60) Provisional application No. 62/010,619, filed on Jun. 11, 2014.

(51) Int. Cl.
*G06K 19/06* (2006.01)
*G06K 1/12* (2006.01)
*B28D 5/00* (2006.01)

(52) U.S. Cl.
CPC ..... *G06K 1/12* (2013.01); *B28D 5/00* (2013.01); *G06K 19/06046* (2013.01)

(58) Field of Classification Search
CPC combination set(s) only.
See application file for complete search history.

(56) References Cited

U.S. PATENT DOCUMENTS 5,206,496 A 4/1993 Clement et al.
5,761,111 A * 6/1998 Glezer ..... G11B 7/0045 365/106
6,392,683 B1 5/2002 Hayashi
6,734,389 B2 5/2004 Troitski
6,744,458 B2 * 6/2004 Yamada ..... B41M 5/262 219/121.61
7,060,933 B2 6/2006 Burrowes et al.
9,600,694 B1 3/2017 Memering et al.
2008/0304525 A1 12/2008 Kupisiewicz et al.
2010/0055022 A1 * 3/2010 Linares ..... C01B 32/28 423/446
2010/0119808 A1 5/2010 Li et al.
2012/0052275 A1 * 3/2012 Hashimoto ..... C03C 3/087 428/215
2014/0087197 A1 * 3/2014 Weber ..... G02B 1/105 428/432
2017/0008798 A1 1/2017 Mimoun et al.

FOREIGN PATENT DOCUMENTS

CN 103422162 A * 12/2013
EP 2721698 4/2014
GB 2552406 1/2018
WO WO2015/139929 9/2015

* cited by examiner

*Primary Examiner* — Elizabeth L McKane
(74) *Attorney, Agent, or Firm* — Brownstein Hyatt Farber Schreck, LLP

(57) ABSTRACT

A manufacturing method for sapphire crystal material is disclosed, including a laser-etched bar code formed into the interior of the sapphire crystal material. The laser-etched bar code may be associated with one or more manufacturing parameters or other manufacturing data. The sapphire crystal may be used to create a cover sheet for use with a display screen of a portable electronic device.

40 Claims, 9 Drawing Sheets

LASER MARKING PROCESS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED [APPLICATION] *APPLICATIONS*

This application is a *reissue patent application of U.S. Pat. No. 9,600,694, issued Mar. 21, 2017 and titled "Laser Marking Process," which is a* non-provisional patent application of and claims the benefit to U.S. Provisional Patent Application No. 62/010,619, filed Jun. 11, 2014, and titled "Laser Marking Process," the [disclosure] *disclosures* of which [is] *are* hereby incorporated herein by reference in [its entirety] *their entireties*.

TECHNICAL FIELD

The described embodiments relate generally to methods of manufacturing a crystal material. More particularly, embodiments relate to forming a laser mark in an internal portion of a sapphire material.

BACKGROUND

Recent advances in portable electronics allow portable electronic devices to be carried most anywhere. As such, these devices may be subjected to various environments and conditions which are hostile to the materials used to construct these devices. In particular, the outer surface of a portable electronic device, such as the screen portion, may be subjected to scratching or surface abrasions. Traditionally, glass has been used to protect portions of the outer surface such as the screen portion, which may become scratched or broken when subjected to normal use.

In some cases, a harder and more scratch resistant surface, such as sapphire may be advantageous as compared to traditional glass materials. However, the use of sapphire as a component may present challenges over conventional silicate glass. In particular, the quality of sapphire as a raw material may be highly dependent on manufacturing conditions. In some cases, it may be beneficial to track the manufacturing conditions or process parameters as a sapphire component is being made.

Further, use of synthetic sapphire crystal, as compared to glass, in fabricating components for electronic devices may result in much greater variability of the resultant material and defects from the manufacturing process. In order to ensure product quality control it may be useful to track information such as manufacturing characteristics related to each step of the process in order to improve process operations and provide production control. Because the surface of the sapphire material is removed multiple times during the production process, surface marking of the sapphire can be unsuitable for use as a tracking method.

SUMMARY

Some example embodiments are directed to a laser mark that is created within a sapphire material using a laser beam. The laser mark may include information encoded in a small bar code or other graphical element that is formed within a sapphire sheet. The laser mark may be used to track the sapphire component, the device, and/or original sapphire boule.

Some example embodiments are directed to a method of manufacturing a sapphire component of a portable electronic device. The method may include forming a laser mark on a portion of the interior of the component between the upper surface and the lower surface. Forming of the laser mark may be performed when one of the upper and lower surfaces are substantially unpolished. The laser mark may include encoded information. After forming the laser mark, the upper and lower surfaces of the component may be polished. In some embodiments, the encoded information includes information associated with the growing of an associated synthetic crystal boule. In some cases, the laser mark is detectable after the polishing.

In some embodiments, the upper surface of the sheet is substantially unpolished and forming the laser mark includes covering at least a portion of the upper surface with a liquid having an index of refraction approximately equal to an index of refraction of the sheet. The laser mark may be formed while the portion of the upper surface is covered with the liquid. In some embodiments, the sheet includes an uneven upper surface and forming the laser mark includes providing a lens adjacent to the upper surface, and forming the laser mark using the lens. In some embodiments, forming the laser mark includes focusing a laser beam at a location between the upper and lower surfaces to alter an index of refraction of the sapphire component at the location. In some embodiments, the forming of the laser mark includes etching an interior portion along a neutral axis of the sheet between the upper surface and the lower surface.

In some embodiments, forming the laser mark includes etching a bar code into the portion of the sapphire component. The bar code may encode information associated with a manufacturing condition of the growing of an associated crystal boule.

Some example embodiments are directed to a cover sheet for a portable electronic device. The cover sheet may be formed from a synthetic crystal sheet having an upper surface and a lower surface. The crystal material may also include a laser-etched mark between its upper surface and lower surface. In some embodiments, the cover sheet is substantially transparent to light and the marking includes information associated with a manufacturing condition of the synthetic crystal. In some embodiments, the synthetic crystal is sapphire.

The laser-etched mark may be located along a neutral axis of the sheet. The marking may be formed substantially perpendicular to the upper surface. The laser-etched mark may be substantially undetectable to an unaided eye.

Some example embodiments are directed to a portable electronic device including a housing, a display disposed within the housing, and a cover sheet attached to the housing and disposed over the display. The cover sheet may include a synthetic crystal material having an upper surface and a lower surface, and a marking within the sheet between the upper surface and the lower surface. The marking may include information associated with a manufacturing condition of the synthetic crystal.

In some embodiments, the size of the laser-etched mark can be minimized such that the mark is machine readable and sufficiently small that it is substantially not visible to the naked or unaided eye. For example, laser mark may not be readily detected by a person without the use of external optics (e.g., lenses) or special, illumination techniques. In some embodiments, the mark is approximately 126μm× 126μm.

BRIEF DESCRIPTION OF THE DRAWINGS

The disclosure will be readily understood by the following detailed description in conjunction with the accompanying drawings, wherein like reference numerals designate like structural elements, and in which.

DESCRIPTION

Figure 1:
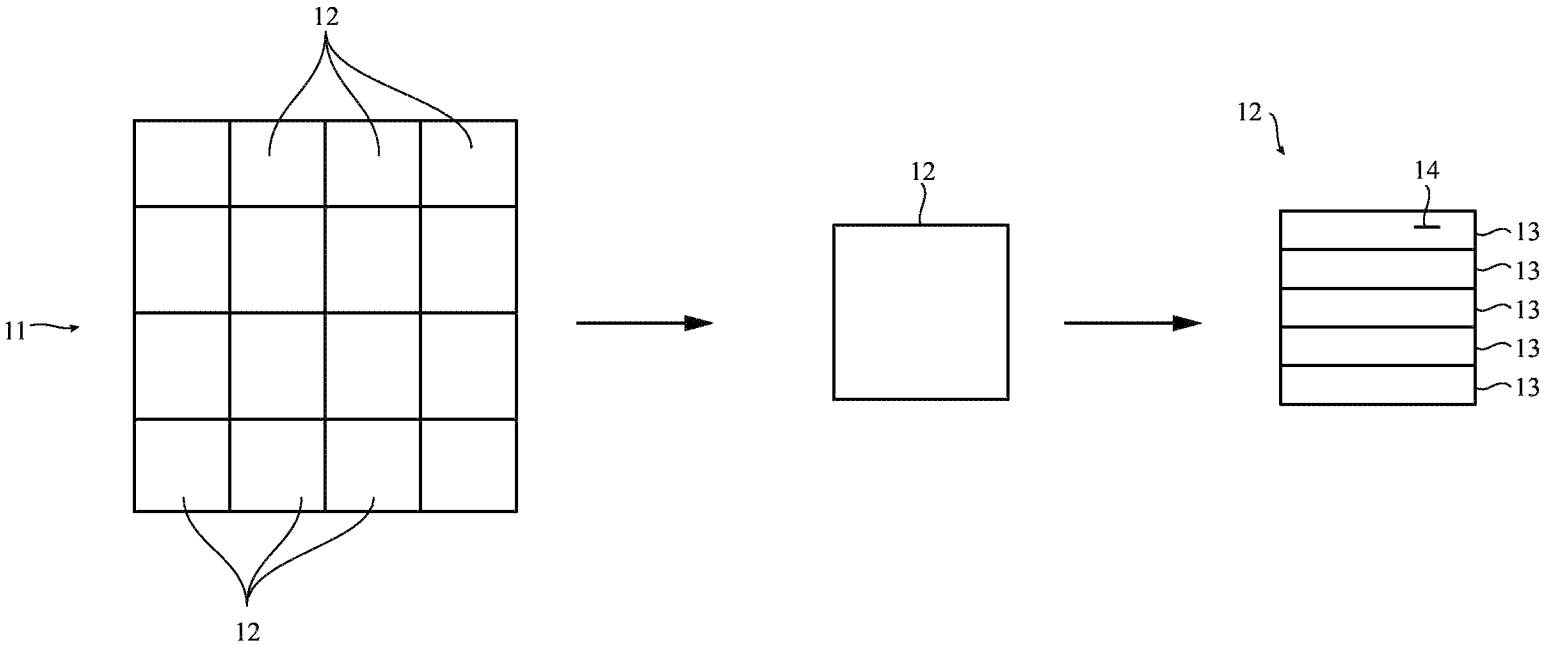
FIG. 1 shows a boule of synthetic sapphire crystal divided into a plurality of brick portions and further divided into sheets sawed from these brick portions.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

As described herein, a laser mark may be formed within a transparent material, such as sapphire. In some embodiments, a laser mark is formed by focusing laser energy within the bulk of the material to locally destroy the structure. The local destruction of the structure may result in a change or alteration in index of refraction of the material which can render the locally-destroyed area optically or machine detectable, but difficult to see without optical aids or specific lighting conditions.

In some embodiments, the laser mark is formed by damaging or altering the crystalline structure of sapphire in a very small region to create a region having a slightly different optical index. In some embodiments, a laser is used to alter the index of refraction of the material over a localized region. In some embodiments, regions created in this fashion may further reduce the visibility of the mark from common viewing angles of a user while still preserving the detectability of the bar code marking via controlled orientation lighting and imaging apparatus.

By placing a laser mark, such as a small bar code, within the material, the mark may survive unaltered through a series of surface removal process steps. Also, by locating the laser mark on or near the neutral axis of the material, a reduction in stress-related breakage of a resulting part, such as a display or cover glass made from the sapphire wafer, or a camera window, may be achieved.

In practice, creating this type of mark can be very challenging. For example, the surface of the sapphire at the early process stages where the laser mark is to be applied may not be polished, but rather rough and diffuse, which may tend to scatter laser energy. One approach to overcome the difficulty of focusing a laser beam within the sapphire crystal surface is to use a surface fluid having a refractive index substantially matching that of the sapphire. In some embodiments, this provides a uniform surface, thereby reducing surface scatter and improving laser light transmission into the sapphire crystal.

In some embodiments, a laser mark may include encoded information in, for example a bar code or other optically encoded data. In these cases, laser mark can be used to track key manufacturing and material processing information through the manufacturing process and even through the service life of the product. The laser mark can be used to identify potential problems, adapt manufacturing processes, and improve reliability over time. The laser mark or bar code can also be used to provide a simple check to ensure components are authentic or originate from an authorized vendor. Furthermore, because the cost of sapphire components may be high, reducing the rework of sapphire parts, even after a display lamination process, may be important for cost recovery. A laser mark or bar code may be useful in this scenario because the rework may involve re-polishing of the sapphire surface. A laser mark may also be useful to track the repair history of the part. For example, repeated replacement of the part may indicate user abuse or other factor or cause of frequent repairs. A laser mark internal to the sapphire material may be less susceptible to obfuscation caused by polishing and, therefore may be advantageous to ensure accurate tracking of the rework history for a specific sapphire part.

Techniques and methods described herein may be particularly well suited for manufacturing components from a sapphire material, including a cover glass or other display surface, a button, a window (for example, a window disposed over a camera or camera lens), a lens, an input surface, or a portion of an exterior housing. In particular, the following techniques may improve the manufacturing process for a sapphire part as compared to some processes used to manufacture traditional glass components. For conventional glass, the material properties and incoming quality of the glass used for display covers, windows, external surfaces and the like is of such a high consistency that a basic inspection for gross defects may be sufficient. Additionally, the consistency of strength and cosmetic quality of finished glass parts may be relatively high negating the need for manufacturing controls and parameter tracking. In addition, for conventional glass elements, the chemical strengthening process may be the dominant factor for increasing strength in a consistent production process. Because the degree of strengthening may be checked on all parts, important quality measures or parameters may be gathered and recorded toward the end of the manufacturing process.

FIG. 1 shows a process for dividing a boule 11 of synthetic sapphire crystal into a group of brick portions 12. That is, the synthetic sapphire crystal boule is grown and various brick portions 12 may be cut from it. Sheets 13 may then be sliced or sawed from these brick portions 12. In a typical process, as many as 16 bricks 12 may be cut from a single boule 11, although this depends on the size of the boule and bricks. Depending upon the size of the bricks, a set of sheets 13 may be cut from each brick 12. Each time the sapphire crystal is cut, a new surface is created. Thus, placing a marking on the cut piece, whether it is brick 12 or sheet 13, at each step of the process may not be feasible or practical.

A bar code, logo, alphanumeric string, graphic, QR code, or other code (collectively, "bar code") 14 may be placed on an interior portion of each sheet to identify that particular piece of material and manufacturing characteristics associated therewith. For example, the bar code 14 may identify the manufacturing characteristics, including the date of manufacture of the crystal, the location of manufacture of the crystal, and manufacturing parameters that may help determine the quality or origin of the material. Such information may aid in later quality and production control processes and assist in rework, refurbishment or repair processes as discussed herein. For example, knowing the origin of the crystal may allow comparison with other pieces made from the same boule. It should be appreciated that the bar code 14 may include substantially any information desired such as a point of origin, company data, information identifying shipping and/or handling of the crystal or components formed therefrom, although manufacturing characteristics are discussed herein.

Figure 2:
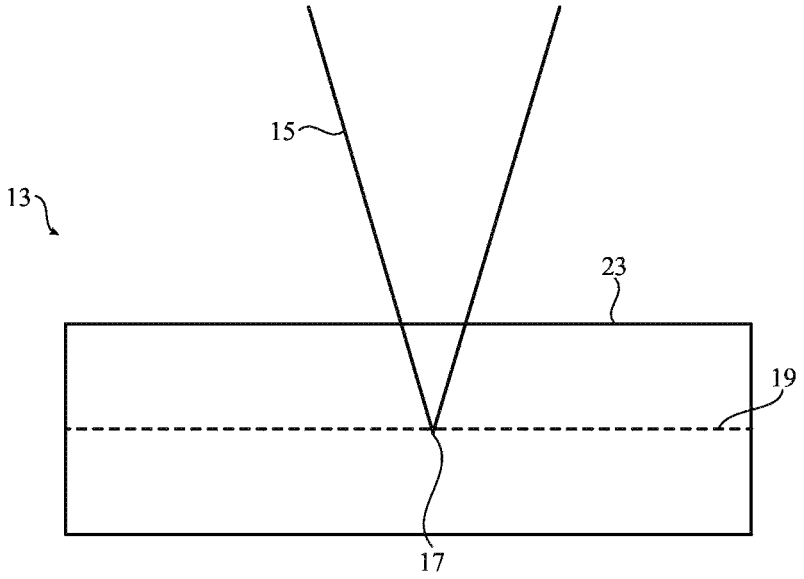
FIG. 2 is a side view of a laser etching a bar code on a sapphire sheet.

Bar code 14 may be formed with the material, which, in one embodiment is sapphire, using a laser-based process. Referring to FIG. 2, a side view of a laser beam 15 is shown penetrating an upper surface 23 of a sapphire component, such as sapphire sheet 13. Sapphire sheet 13 may be one of sheets described above in FIG. 1, although it should be appreciated that any sapphire component may be encoded as described herein. Accordingly, the term "sapphire sheet" is intended to embrace other forms and geometries of sapphire components.

The location at which the focal point 17 of laser beam 15 intersects within sapphire sheet 13 is where the energy density of laser beam 15 is highest and it is this point where the internal crystal structure may be altered by laser beam 15 so as to leave a series of marks to form bar code 14. In some embodiments, laser beam 15 changes the refractive index of the sapphire material at focal point 17 such that the marks left by laser beam 15 may not be visible to the unaided eye but are detectable with the proper optical equipment. In some embodiments, the bar code 14 is substantially undetectable to the unaided human eye. In some embodiments, the bar code 14 is placed on a neutral axis 19 of sapphire sheet 13. By placing it on the neutral axis 19, bar code 14 may not be detectable to the unaided eye and the laser marking does not compromise the stress tolerance of sapphire crystal sheet 13.

Figure 3:
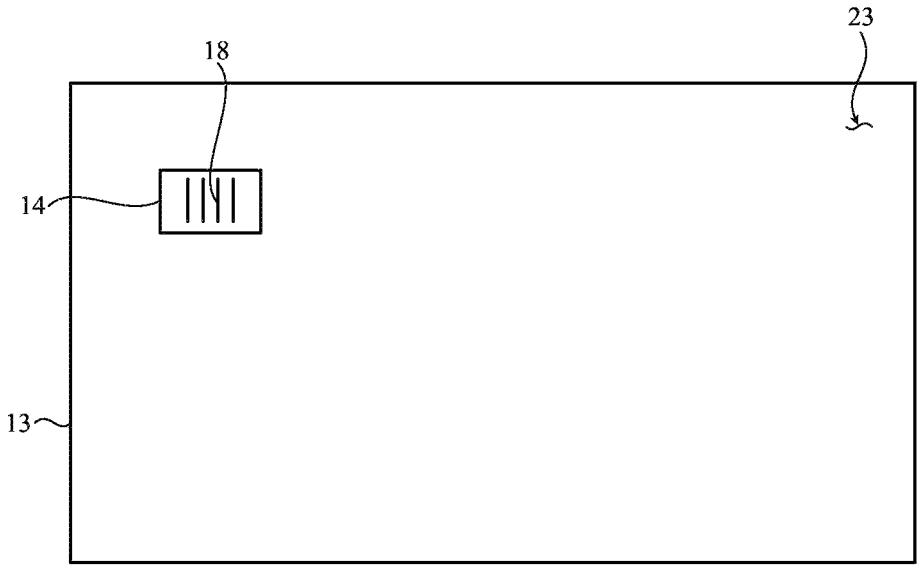
FIG. 3 shows a top view of a bar code etched in a sapphire sheet.

Referring to FIG. 3, a top view of sheet 13, shown looking through upper surface 23, illustrates bar code 14 etched inside sheet 13. Although the simplified representation of the bar code 14 in FIG. 3 is depicted as a series of lines (characters 18), the bar code 14 may include a 1-dimensional, 2-dimensional, or 3-dimensional pattern of shapes that encode information, such as characters or symbols. Bar code 14 covers approximately 126μm×126μm in which characters 18 can be placed to track the origin of sheet 13 for quality control and manufacturing process purposes. In some embodiments, the bar code 14 may include up to 31 characters, although the exact number of characters, as well as the dimensions of the code, may vary between embodiments. The bar code 14 may be used to track the source or origin of the sheet in terms of which boule it came from, the date of manufacture, the location of the furnace or other equipment that was used, or other manufacturing parameters which could later be used to improve the manufacturing process. This valuable information may be lost if the bar code was placed in a location in which the bar code would not be preserved such as on an outer surface of a sheet or brick. In some embodiments, the laser mark or bar code can also be used to provide a simple check to ensure components are authentic or originate from an authorized vendor.

Figure 4:
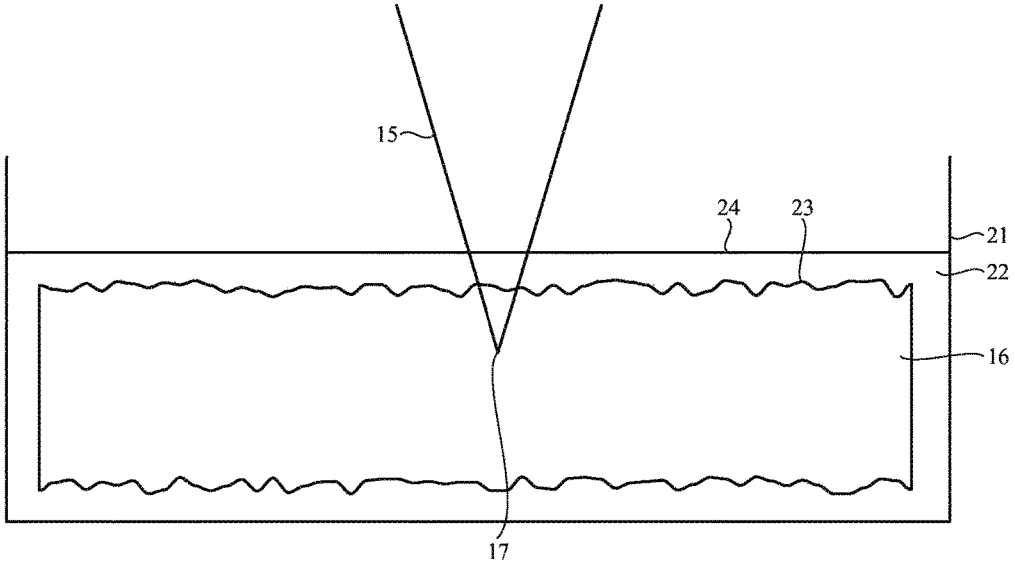
FIG. 4 is a side view of a laser etching a bar code on a sapphire sheet through a liquid layer.

With respect to FIG. 4, in order to improve the laser etching process of sapphire sheet 13, the sheet 13 may be placed in an enclosure 21 and a liquid 22 disposed on at least a portion of upper surface 23 of sapphire sheet 13. As mentioned above, the sawing of sheet 13 from brick 12 may result in upper surface 23 being uneven as is shown in FIG. 4. Liquid 22 may be selected so as to have a light refractive index approximately equal or substantially matched to that of the sapphire sheet 13. By placing liquid 22 on the uneven surface 23 of sheet 13, the laser beam used to etch the internal surface may enter the part via a uniform surface 24. The uniform surface 24 may not diffuse laser beam 15 as may otherwise occur if laser beam 15 were directed at uneven surface 23 without refractive liquid 22. In one embodiment, liquid 22 is placed over at least the portion of the sheet 13 through which laser beam 15 is directed to form the laser mark on the interior portion of sheet 13.

Figure 5:
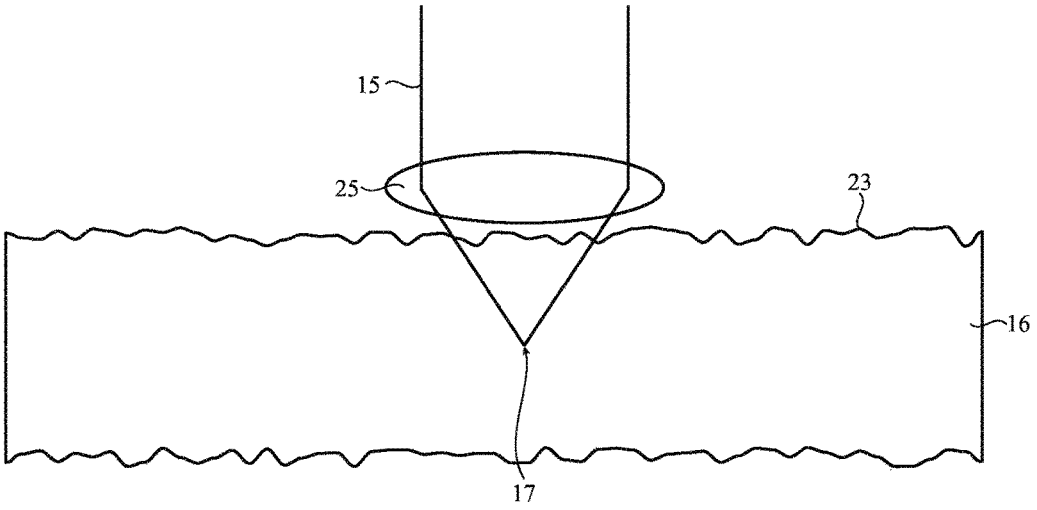
FIG. 5 is a side view of a laser etching a bar code on a sapphire sheet through a lens.

Referring to FIG. 5, a lens 25 may be placed adjacent to surface 23 to focus the laser beam within the material and minimize diffusion caused by the uneven surface 23. Without lens 25, energy from the laser beam 15 may be dissipated by an uneven surface 23 and cause damage at the surface 23 or affect the etching operation. By using lens 25, the energy of laser 15 may be relatively dispersed at the surface 23 and relatively concentrated at the focal point 17 inside the sheet 13. This may improve the efficiency of a laser marking operation. The use of lens 25 may be in addition to, or in place of, the liquid layer described with respect to FIG. 4 in order to focus laser beam 15 at the location where bar code 14 is to be formed.

Figure 6:
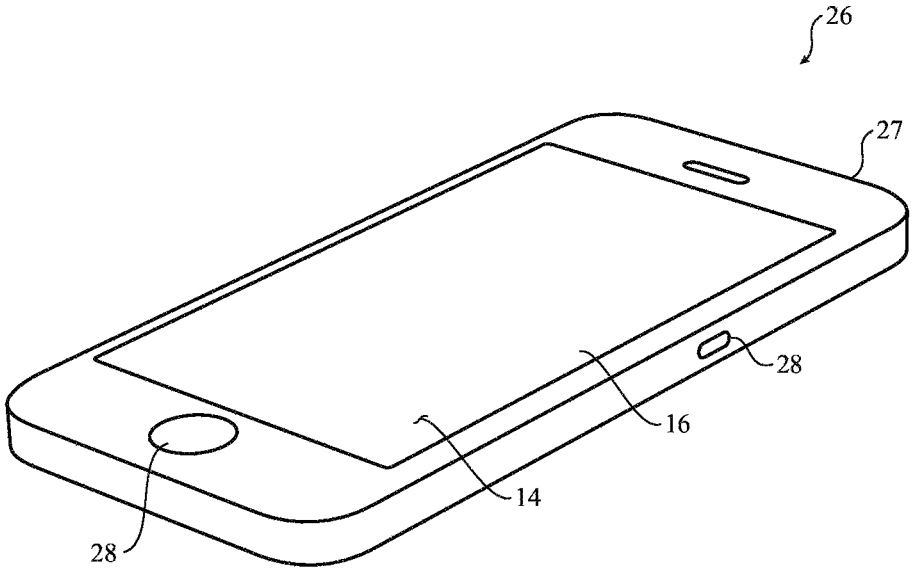
FIG. 6 is a view of a smartphone with a sapphire glass display window.

FIG. 6 depicts an example portable electronic device, specifically a smartphone 26, incorporating a marked sapphire element as discussed herein. The portable electronic device could also be a wearable device, health monitoring device, tablet computer, laptop computer, media player or other electronic device as the embodiments disclosed herein are not limited to a smartphone. Smartphone 26 includes a housing 27 and various control inputs 28 used to provide user input. In some embodiments, a cover sheet is attached the housing 27 via a pressure-sensitive adhesive, fastener, or other attachment technique. The cover sheet 16 which, in some embodiments, may be sapphire crystal sheet, as described herein. Cover sheet 16 may include bar code 14 and may be manufactured in accordance with various embodiments described herein. Bar code 14 may be placed in an inconspicuous location on the cover sheet 16 so as not to be readily perceived by a user of the portable electronic device.

Figure 7:
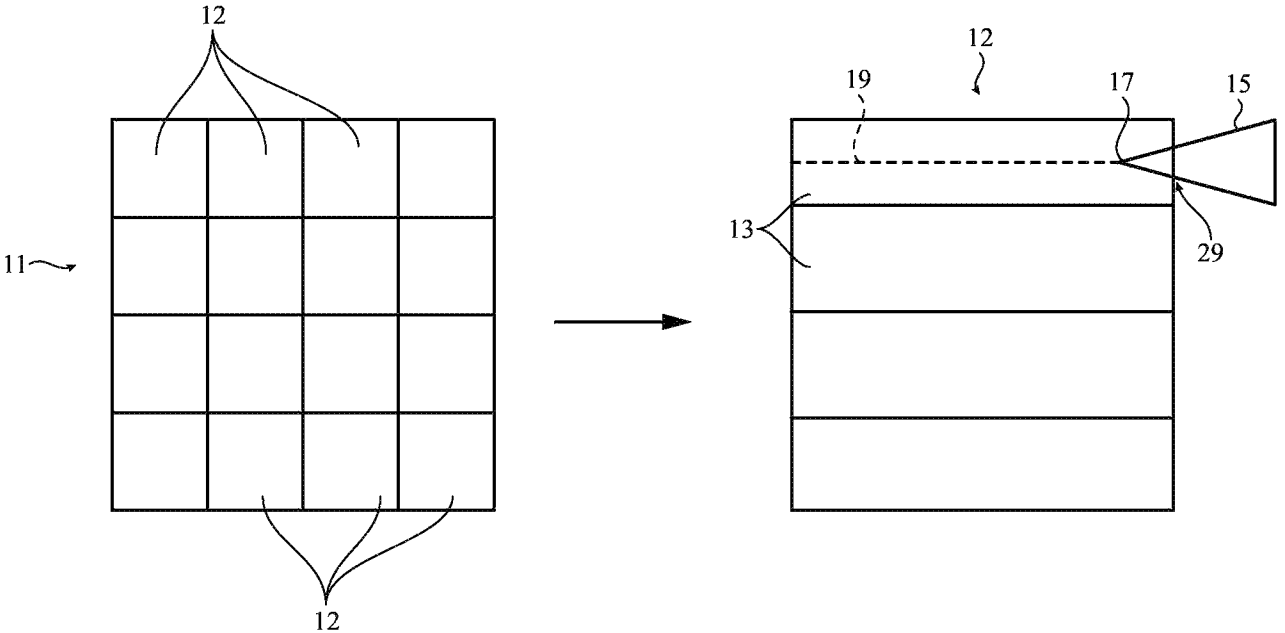
FIG. 7 is an alternate embodiment showing a laser etching a bar code in a brick of sapphire crystal material.

Referring to FIG. 7, bar code 14 may be placed directly into brick 12 rather than being placed into sheets 13 after they have been cut from brick 12. The boule 11 of synthetic sapphire crystal is shown divided into a plurality of brick portions 12. As with the embodiment described in FIG. 1, the synthetic sapphire crystal boule 11 is grown and various brick portions 12 may be cut from it. Prior to sheets 13 being sawed from these brick portions 12, bar code 14 may be placed on the interior portions of each brick 12 at various portions coinciding with location of the sheets 13 to be cut from the brick portion 12. In some embodiments, the bar code 14 is formed along a plane that is perpendicular or otherwise transverse to the side surface of brick portion 12 such that it will also be perpendicular to the neutral axis 19 and upper and lower surfaces on each sheet portion. In such embodiments, bar code 14 may be readable from an end surface 29 of sheet 13 rather than from an upper surface 31 of sheet 13 which upper surface coincides with a user's view of a cover sheet 16 in smartphone 26. In some embodiments, a user may have even more difficulty visually detecting bar code 14 with his or her naked eye making bar code 14 potentially more useful as an anti-counterfeiting measure. In some embodiments, viewing the bar code 14 would require disassembly of cover sheet 16 front smartphone 26 in order to view the bar code from the side of cover sheet 16.

Figure 8:
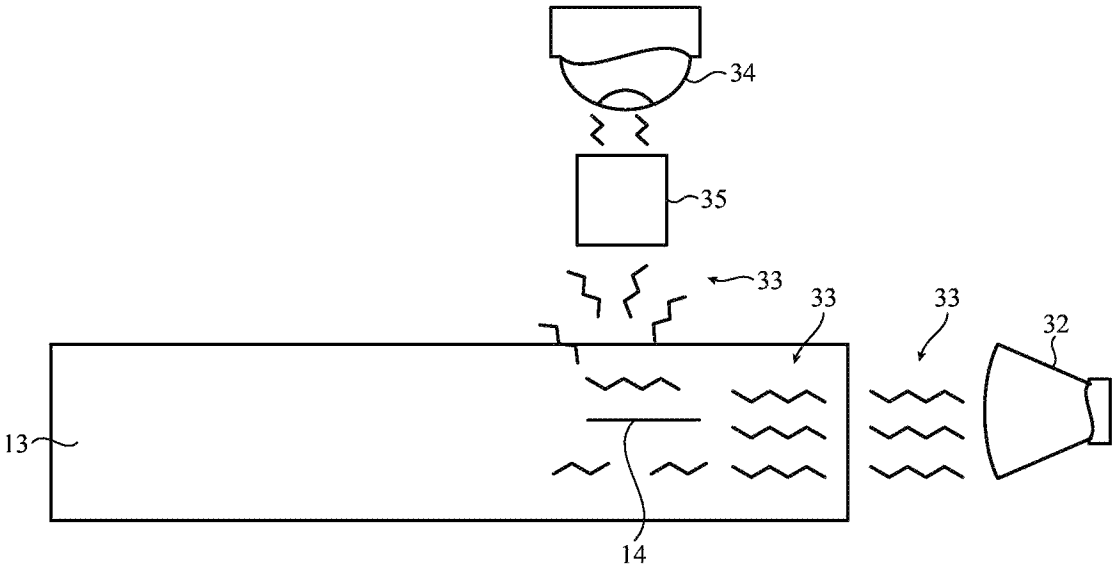
FIG. 8 is a side view showing a light source illuminating a bar code in a sapphire crystal.

FIG. 8 is a side view of a sheet 13 of crystal sapphire material with bar code 14 included therein. A light source 32, which, in one embodiment, may be a high intensity light source, propagates light rays 33. Light rays 33 enter sheet 13 generally parallel with the orientation of bar code 14 but some of light rays 33 are scattered normal to the orientation of bar code 14 so as to be detectable by an observer, either with an unaided (naked) eye 34, or with optical equipment 35. In this way, bar code 14 may be read, either during the manufacturing process, or after sheet 13 is processed into cover sheet 16 in order to identify manufacturing characteristics of the sheet including the source or origin of the original sapphire crystal from which the resulting cover sheet 16 was made.

Figure 9:
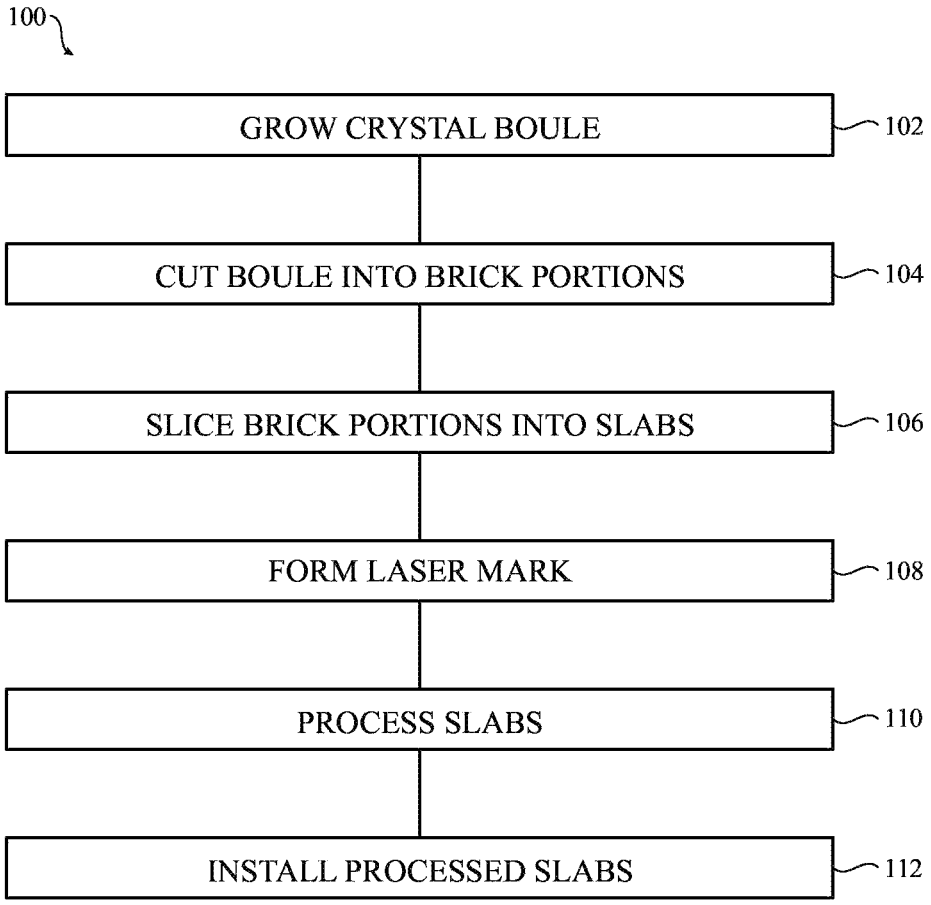
FIG. 9 is a flow chart illustrating a manufacturing method for sapphire crystal displays.

FIG. 9 is a flow chart of a sample sapphire component manufacturing process 100. The example process 100 may be used to create or manufacture a cover 16, as described above with respect to FIG. 6. Process 100 may also be used to create other types of sapphire parts having a laser mark formed or embedded within the sapphire material.

In operation 102, a synthetic sapphire crystal boule is grown (e.g., item 11 of FIG. 1). One technique for manufacturing sapphire may include use of a sapphire seed crystal which is dipped into a crucible containing molten alumina, and then slowly withdrawn upward at a rate of one to 100 mm per hour. The alumina may crystallize on an end, creating long carrot-shaped boules of large size up to 200 kg in mass. In some cases, the manufacturing processes may be imprecise or variable, which may introduce imperfections or variations into the boule. Thus, in some cases, it may beneficial to be able identify and track both defective and high quality boules. In some embodiments, the boule identification may be used to locate high quality material. In some embodiments, the identification can also be used to troubleshoot the manufacturing process by tracking potential material issues all the way back to the boule creation operation 102.

In operation 104, a boule is cut into bricks and at operation 106 those bricks are sliced into sheets (e.g., item 13 of FIG. 1). During these process operations, as with the boule manufacturing process, defects can be introduced into the bricks and sheets. Again, it may be beneficial that any such defects be identified so that errors of the same type are not repeated. By identifying the source of a cover sheet which is found to have a certain defect, it may be determined whether other cover sheets from the same boule processing batches suffer from the same defect and the boule processing may thus be improved. In some embodiments, the sapphire sheet may have rough saw-cut surfaces due to the slicing operation, which may be difficult to mark using traditional surface-marking techniques.

In operation 108, a laser mark is formed. In some cases, a bar code is formed using a laser-based process into an inner portion of the sheets and/or bricks formed in operations 104 and 106, respectively. The laser mark may include information associated with the growing of a synthetic crystal boule (e.g., operation 102). For example, the manufacturing conditions or parameters of the boule from which the brick and sheet, and later the cover sheet made therefrom, may be encoded into a bar code that is formed as a laser mark on an interior portion of the sheet. Further, the source or origin of the sapphire crystal, including the furnace, manufacturing facility, and time of manufacture may be associated with the bar code. Other manufacturing conditions or parameters, including the temperature, crystal growing conditions, or other manufacturing data may be associated with the bar code. The laser mark may be used to track the part and/or facilitate quality control. In some embodiments, the information contained in the laser mark may be critical in the quality control process in order to identify manufacturing or process operations which can be improved as discussed above.

In some embodiments, operation 108 is performed before any substantial polishing has been performed on the surface of the sheet. For example, the bar code may be formed while the surface of the sheet is still rough from the slicing operation of operation 106. As described previously with respect to FIGS. 4 and 5, the formation of a laser mark may be facilitated by using an index matching liquid and/or optical lens to assist in focusing the laser beam within the sapphire material. In other embodiments, operation 108 may be performed after polishing and/or other machining operations are performed on the sheet surface.

In operation 110, the sliced (and marked) sheets may be subjected to further processing, including polishing, grinding, and/or lapping the surfaces. In some cases, the sliced sheets are polished to a high grade surface finish in order to produce cover sheets (e.g., item 16 of FIG. 6). In some embodiments, because bar code is formed within an interior portion of sheet, the polishing, finishing or lapping processes do not remove or otherwise obscure bar code. If a mark or traditional printing were to be formed onto the surface of sheets, the polishing of those sheets could obliterate, or at least partially obscure the mark. Also, by forming the bar code on the interior of the sheets between upper and lower surfaces, bar code remains intact and may be read as described herein. Thus, useful information relating to the growing of boule as well as the subsequent processing of bricks and sheets may be preserved. At operation 112, the processed sheets (e.g., cover sheets) may be incorporated or installed into a portable electronic device. In some embodiments, operation 112 is optional or performed as part of a separate manufacturing process. For example, the cover sheets may be manufactured separately and then shipped or transferred to another facility for installation into a portable electronic device.

The inclusion of bar code 14 in each cover sheet 16 permits quality control in the finished cover sheets and may be used to improve the manufacturing process of those cover sheets. While bar code 14 may advantageously be used to improve the manufacturing process for sapphire crystal, it can be appreciated that bar code 14 may also aid in counterfeit detection of display covers (or other components) that have been used to replace the original cover. In addition to counterfeit detection, bar code 14 could be used in tracking reworked cover sheets or displays. That is, where a user of a portable electronic device returns that device to the manufacturer because of defects in the screen portion of the device, bar code 14 could be read to determine origins of the display and whether it was part of the original electronic device or whether it was added after purchase by the user. If particular defects occur repetitively in displays with similar bar codes then the manufacturer may determine that a particular batch of sapphire crystal may be defective and take corrective measures to avoid similar occurrences in the future. If the display screen was damaged by the user, identification information would also be useful to determine if this user has damaged previous display screens. In some embodiments, the laser mark or bar code can also be used to provide a simple check to ensure components are authentic or originate from an authorized vendor.

While the disclosed embodiments have been described primarily with respect to synthetic sapphire crystal glass production, it can be appreciated that application of the laser identification process disclosed herein may find application in any number of processes and in particular with respect to the production of transparent glass products using a variety of materials including ordinary silicate glass based products. In addition, while the disclosed embodiments have utilized a particular type of fast laser etching process, it should be expressly understood that any suitable laser etching process for inscribing or forming a bar code on the interior of a transparent glass like material may be utilized.

The foregoing description, for purposes of explanation, used specific nomenclature to provide a thorough understanding of the described embodiments. However, it will be apparent to one skilled in the art that the specific details are not required in order to practice the described embodiments. Thus, the foregoing, descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method for manufacturing a cover sheet for a display of a portable electronic device, the method comprising:

growing a synthetic single-crystal sapphire boule;

cutting the synthetic [single crystal] *single-crystal* sapphire boule into a brick portion;

slicing the brick portion into a single-crystal sheet having an upper surface and a lower surface;

forming a laser mark on a portion of the interior of the single-crystal sheet between the upper surface and the lower surface *and along a neutral axis of the single-crystal sheet*, wherein the laser mark includes encoded information; and after forming the laser mark, polishing the upper and lower surfaces of the [single crystal] *single-crystal* sheet to form the cover sheet.

2. The method of claim 1, wherein the encoded information includes information associated with the growing of the synthetic single-crystal *sapphire* boule.

3. The method of claim 1, wherein the forming of the laser mark includes focusing a laser beam at a location between the upper and lower surfaces to alter an index of refraction of the material at the location.

4. The method of claim 1, wherein the forming of the laser mark is performed when one of the upper and lower surfaces [are] *is* substantially unpolished.

5. The method of claim 4, *wherein the upper surface is substantially unpolished and* the method further [comprising] *comprises*:

covering at least a portion of the upper surface with a liquid having an index of refraction approximately equal to an index of refraction of the single-crystal sheet; and forming the laser mark while the portion of the upper surface is covered with the liquid.

6. The method of claim 1, wherein the single-crystal sheet includes an [uneven] *unpolished* upper surface and the method further comprises:

positioning a lens adjacent to the upper surface; and forming the laser mark using the lens.

7. The method of claim 1, wherein the forming of the laser mark includes etching a bar code into the portion of the single-crystal sheet, wherein the bar code encodes information associated with a manufacturing condition of the growing of the synthetic *single*-crystal *sapphire* boule.

8. The method of claim 1, wherein the forming of the laser mark includes etching an interior portion along [a] *the* neutral axis of the single-crystal sheet between the upper surface and the lower surface.

9. The method of claim 1, wherein the laser mark is optically detectable after polishing the upper and lower surfaces.

10. A cover sheet for a portable electronic device comprising:

a sheet of synthetic single-crystal having an upper surface and a lower surface; and a laser-etched [mark] *marking* formed within the *synthetic* single-crystal sheet between the upper surface and the lower surface *and along a neutral axis of the single-crystal sheet*, wherein the single-crystal sheet is substantially transparent to light and the marking includes information associated with a manufacturing condition of the synthetic single-crystal sheet.

11. The cover sheet of claim 10, wherein [the marking is located along a neutral axis of the single-crystal sheet] *the neutral axis of the cover sheet is positioned halfway between the upper surface and the lower surface*.

12. The cover sheet of claim 10, wherein the [laser] marking is substantially undetectable to an unaided eye.

13. The cover sheet of claim 10, wherein the marking is formed in a direction that is substantially perpendicular to the upper surface.

14. The cover sheet of claim 10, wherein the synthetic single-crystal sheet is formed from sapphire.

15. A portable electronic device comprising:

a housing;

a display disposed within the housing;

a cover sheet attached to the housing and disposed over the display, the cover sheet including:

a synthetic single-crystal material having an upper surface and a lower surface, and a laser-etched [mark] *marking* within the *cover* sheet between the upper surface and the lower surface *and along a neutral axis of the cover sheet*, the marking [includes] *including* information associated with a manufacturing condition of the synthetic single-crystal material.

16. The device of claim 15, wherein the manufacturing condition indicates [the] *a* repair history of the cover sheet.

17. The device of claim 15, wherein [the marking is located along a neutral axis of the cover sheet] *the neutral axis of the cover sheet is positioned halfway between the upper surface and the lower surface*.

18. The device of claim 15, wherein the manufacturing condition of the synthetic single-crystal material includes one or more of: a manufacturing date, a manufacturing location; or a manufacturing parameter.

19. The device of claim 15, wherein the marking is substantially undetectable to an unaided human eye.

20. The device of claim 15, wherein the synthetic single-crystal material is sapphire.

*21. A method for manufacturing a cover sheet for a display of a portable electronic device, the method comprising:*

*forming a laser mark within a chemically-strengthened silicate glass sheet, the laser mark positioned between an upper surface of the silicate glass sheet and a lower surface of the silicate glass sheet and along a neutral axis of the silicate glass sheet, wherein the laser mark includes encoded information; and*

*after forming the laser mark, polishing the upper and lower surfaces of the glass sheet to form the cover sheet.*

*22. The method of claim 21, wherein the encoded information includes information associated with a manufacturing condition of the silicate glass sheet.*

*23. The method of claim 21, wherein the forming of the laser mark includes focusing a laser beam at a location between the upper and lower surfaces to alter an index of refraction of the silicate glass sheet at the location.*

*24. The method of claim 21, wherein the forming of the laser mark is performed when one of the upper and lower surfaces is substantially unpolished.*

*25. The method of claim 24, wherein the upper surface is substantially unpolished and the method further comprises:*

*covering at least a portion of the upper surface with a liquid having an index of refraction approximately equal to an index of refraction of the silicate glass sheet; and*

*forming the laser mark while the portion of the upper surface is covered with the liquid.*

*26. The method of claim 21, wherein the glass sheet includes an unpolished upper surface and the method further comprises:*

*positioning a lens adjacent to the upper surface; and*

*forming the laser mark using the lens.*

*27. The method of claim 21, wherein the forming of the laser mark includes etching a bar code into an interior portion of the silicate glass sheet, wherein the bar code encodes information associated with a manufacturing condition of the silicate glass sheet.*

*28. The method of claim 27, wherein the bar code is within an area of 126 μm by 126 μm.*

*29. The method of claim 21, wherein the laser mark is optically detectable after polishing the upper and lower surfaces.*

*30. A glass cover sheet for covering a display of a portable electronic device, comprising:*

*a chemically-strengthened silicate glass sheet substantially transparent to light and defining an upper surface and a lower surface; and*

*a laser-etched marking formed within the silicate glass sheet between the upper surface and the lower surface and along a neutral axis of the silicate glass sheet, the laser-etched marking including information associated with a manufacturing condition of the silicate glass sheet.*

*31. The glass cover sheet of claim 30, wherein the neutral axis of the silicate glass sheet is positioned halfway between the upper surface and the lower surface.*

*32. The glass cover sheet of claim 30, wherein the laser-etched marking is within an area of 126 μm by 126 μm.*

*33. The glass cover sheet of claim 32, wherein the laser-etched marking is a bar code.*

*34. The glass cover sheet of claim 32, wherein the laser-etched marking is a graphic.*

*35. A portable electronic device comprising:*

*a housing;*

*a display disposed within the housing; and*

*a cover sheet attached to the housing and positioned over the display, the cover sheet including:*

*a chemically-strengthened silicate glass material defining an upper surface and a lower surface, the upper surface defining an exterior surface of the portable electronic device; and*

*a laser-etched marking within the cover sheet between the upper surface and the lower surface and along a neutral axis of the cover sheet, the marking including encoded information associated with a manufacturing condition of the chemically-strengthened silicate glass material.*

*36. The portable electronic device of claim 35, wherein the manufacturing condition indicates a repair history of the cover sheet.*

*37. The portable electronic device of claim 35, wherein the neutral axis of the cover sheet is positioned halfway between the upper surface and the lower surface.*

*38. The portable electronic device of claim 35, wherein the manufacturing condition of the chemically-strengthened silicate glass material includes one or more of a manufacturing date, a manufacturing location, or a manufacturing parameter.*

*39. The portable electronic device of claim 35, wherein the marking is substantially undetectable to an unaided human eye.*

*40. The portable electronic device of claim 35, wherein the marking is a 2-dimensional pattern of shapes within an area of 126 μm by 126 μm and encoding an identifier of the cover sheet.*

* * * * *